(12) United States Patent
Webber

(10) Patent No.: US 9,348,600 B2
(45) Date of Patent: May 24, 2016

(54) PRIORITISING OF INSTRUCTION FETCHING IN MICROPROCESSOR SYSTEMS

(75) Inventor: Andrew Webber, Hertfordshire (GB)

(73) Assignee: Imagination Technologies Limited, Kings Langley (GB)

(*) Notice: Subject to any disclaimer, the term of this patent is extended or adjusted under 35 U.S.C. 154(b) by 903 days.

(21) Appl. No.: 12/322,942

(22) Filed: Feb. 9, 2009

(65) Prior Publication Data

US 2009/0210660 A1    Aug. 20, 2009

(30) Foreign Application Priority Data

Feb. 7, 2008    (GB) .................................... 0802314.5

(51) Int. Cl.
*G06F 9/30* (2006.01)
*G06F 9/38* (2006.01)

(52) U.S. Cl.
CPC .................................... *G06F 9/3851* (2013.01)

(58) Field of Classification Search
None
See application file for complete search history.

(56) References Cited

U.S. PATENT DOCUMENTS

| 6,938,147 | B1 | 8/2005 | Joy et al. |
| 7,657,883 | B2 * | 2/2010 | Jensen .......................... 717/161 |
| 2004/0003203 | A1 * | 1/2004 | Ukai .............................. 712/205 |
| 2005/0235126 | A1 | 10/2005 | Ko et al. |
| 2006/0101238 | A1 | 5/2006 | Bose et al. |
| 2006/0179276 | A1 * | 8/2006 | Banerjee et al. .............. 712/205 |
| 2007/0168649 | A1 | 7/2007 | Anderson et al. |

FOREIGN PATENT DOCUMENTS

| EP | 0 583 089 A3 | 2/1994 |
| EP | 0 891 588 B1 | 1/1999 |
| EP | 1 738 259 A1 | 1/2007 |
| GB | 2 372 349 A | 8/2002 |
| WO | WO 2005/101203 A1 | 10/2005 |

OTHER PUBLICATIONS

International Search Report dated May 4, 2009 (3 pages).
Written Opinion of the International Searching Authority (4 pages).

* cited by examiner

*Primary Examiner* — William B Partridge
(74) *Attorney, Agent, or Firm* — Vorys, Sater, Seymour and Pease LLP; Vincent M DeLuca

(57) ABSTRACT

A method and a system are provided for prioritizing the fetching of instructions for each of a plurality of executing instruction threads in a multi-threaded processor. Instructions come from at least one source of instructions. Each thread has a number of threads buffered for execution in an instruction buffer. A first metric for each thread is determined based on the number of instructions currently buffered. A second metric is then determined for each thread, this being an execution based metric. A priority order for the threads is determined from the first and second metrics, and an instruction is fetched from the source for the thread with the highest determined priority which is requesting an instruction.

19 Claims, 3 Drawing Sheets

Instruction Fetch sub-system

Interconnections

Instruction Fetch sub-system

A Single Thread's Instruction Fetch

Priority

PRIORITISING OF INSTRUCTION FETCHING IN MICROPROCESSOR SYSTEMS

FIELD OF INVENTION

This invention relates to the prioritising of instruction fetching in microprocessor systems and in particular to the implementation of this in multithreaded microprocessor systems.

BACKGROUND OF THE INVENTION

In our European Patent Application No. EP0891588 there is described a multithreaded microprocessor and data processing management system in which a plurality of executing threads are routed between a plurality of data inputs and a plurality of data outputs via a data processing means. The data processing means has access to a data storage means and the system repeatedly determines which routing operations and which data processing operations are capable of being performed, and commences execution of at least one of the routing and data processing operations on each clock cycle.

In such a system, a memory management unit is used to fetch data either from an internal memory cache or from an external memory. Typically external memory has only a single data path and therefore a memory prearbiter is used to arbitrate between requests from different threads for data from memory.

Our European Patent Application No. EP1738259 proposes a scheme for improved memory arbitration using various metrics attached to the various threads which are executing.

Improvements to the type of multithreaded processor described above have introduced the concept of what we refer to as "superthreading". This involves issuing instructions for more than one executing thread on a given dock cycle. At maximum, instructions for all the executing threads can be issued on a single clock cycle which, in a four thread implementation, would involve issuing four instructions per dock cycle. Such an implementation is, however, only fully utilised when all of the possible threads have instructions available and ready to run.

In some implementations of multithreaded processors, threads are provided with an instruction buffer which may, for example, hold up to eight instructions for a thread. The instruction buffer is filled by using a instruction fetch routine which is able to fetch instructions in advance of the current instruction to be used and preferably is also able to determine actions such as branch or hardware loop prediction which may result from instructions.

When multiple threads are being utilised, there are typically only one or two sources from which instruction data may be fetched. These are the instruction cache and embedded instruction random access memory (RAM). Therefore, in a device with four executing threads, there are more threads than sources of instruction data and therefore arbitration between the threads needs to be implemented for access to instruction data to be optimised.

SUMMARY OF THE INVENTION

Preferred embodiments of the present invention address the problem of efficient arbitration between instruction fetching for different executing threads whilst also attempting to ensure that as many threads as possible have at least one instruction in their buffers for subsequent execution.

In accordance with one aspect of this invention there is provided a method for prioritising the fetching of instructions for each of a plurality of executing instruction threads in a multithreaded processor system from at least one source of instructions comprising the steps of: determining a first metric for each thread based on the number of instructions currently buffered for execution on that thread; determining an execution based second metric for each thread; determining a priority order for the threads from the first and second metric; and fetching an instruction from the source for the thread with the highest determined priority that is requesting an instructions.

This and other aspects of the invention are defined in the appended claims to which reference should now be made.

BRIEF DESCRIPTION OF THE DRAWINGS

There now follows a detailed description of a preferred embodiment of the invention which is provided by way of example the reference to the accompanying drawings in which.

DETAILED DESCRIPTION OF A PREFERRED EMBODIMENT

Figure 1:
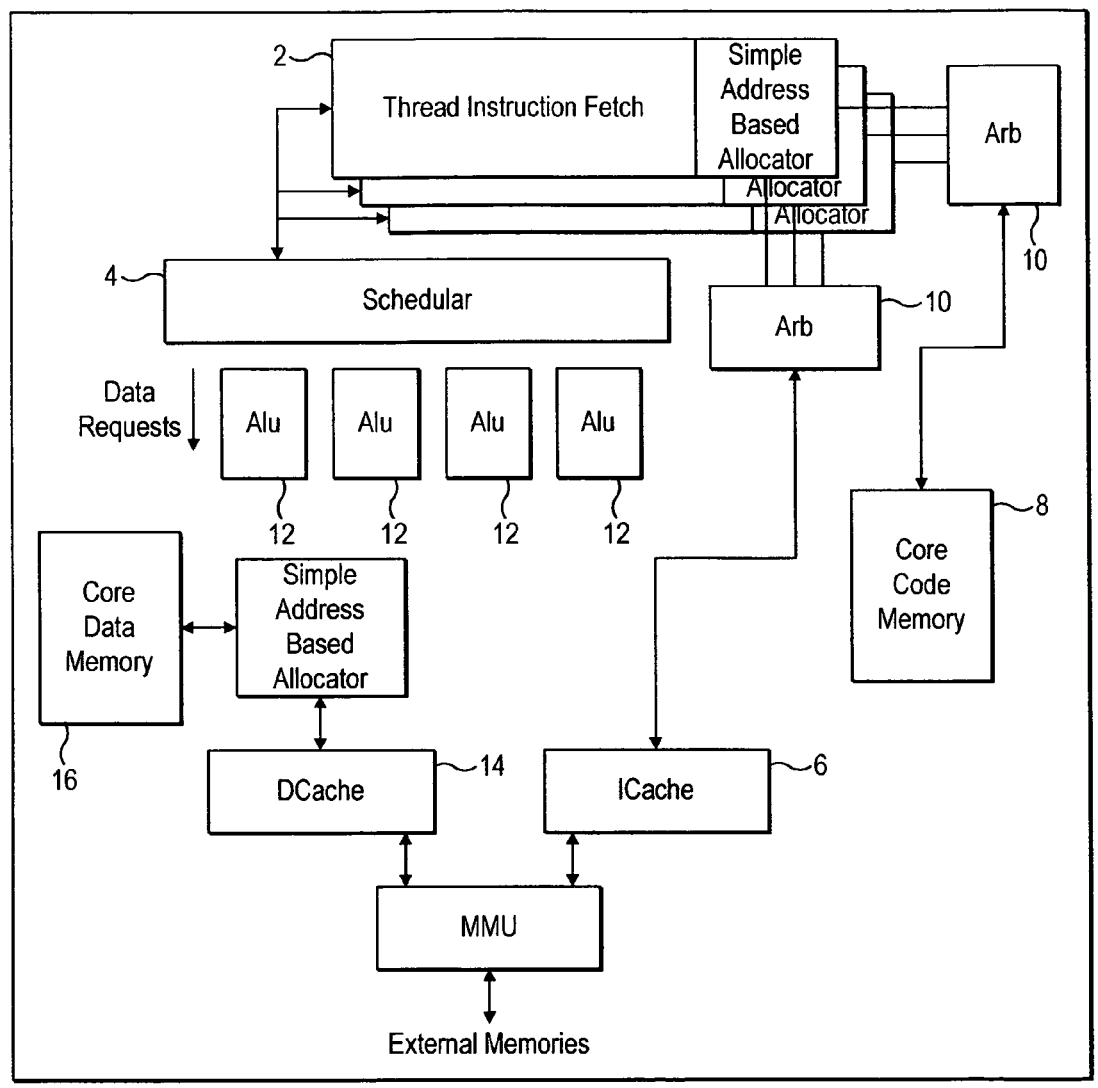
FIG. 1 shows a multithreaded processor embodying the invention.

The system shown in FIG. 1 comprises a multithreaded processor core. This is capable of running a number of threads each of which provide instructions via an instruction fetch unit 2. Instructions to be executed by each of the plurality of executing threads are fetched by thread instruction fetch units 2, one for each thread. Systems may have any number of threads but typically two or four are used at present. In general, these are arranged to operate in parallel subject to their ability to issue instructions via a thread instruction scheduler 4, but could be used in a system where only one thread can execute on each clock cycle. There are two sources of instructions in this example, an instruction cache 6 which retrieves instructions from external memories, and a core code memory 8 which stores operating system instructions and other instructions of this nature. An arbitrator is positioned between the instruction cache and the thread instruction fetch unit 2 and a further arbitrator between the core code memory 8 and the thread instruction fetch units 2. This is used to determine which thread should be next to retrieve an instruction from each source of instructions.

The thread instruction scheduler 4 issues instructions to, in this example, each of four executing pipelines which here are represented by arithmetic/logical units (ALU) 12. These execute the plurality of executing threads.

Requests for data memory on executing threads start off as instructions which are issued and then passed through the instruction scheduler 4 to a decision point where the request is routed to a data cache 14 or to RAM core code data memory 16. Memory management unit (MMU) 18 handles requests from the data cache 14 and the instruction cache 6 to retrieve data from an external memory.

Variations on this arrangement are that the RAM could be shared between code and data. However, this would complicate the implementation and is not currently used. There is, of course, a great deal of interconnection between execution units which is not illustrated here in the interests of clarity, since it is not required to understand the wording of the invention.

A complete implementation may also incorporate small quantities of on chip RAM that can be accessed instead of the cache sub-system 3. Some systems may incorporate instruction RAM and also data RAM.

Figure 2:
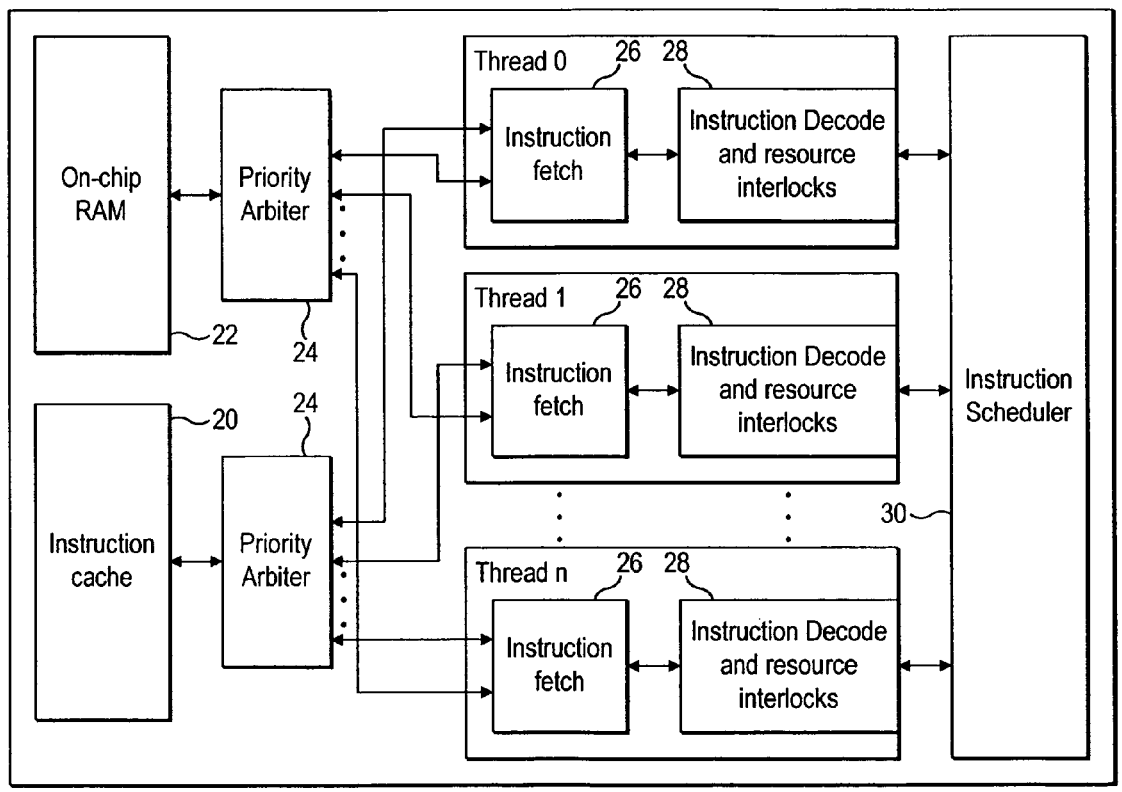
FIG. 2 shows an instruction fetch subsystem for use in the system of FIG. 1.

Multithreaded processors have been described in a number of other documents and will be well known to those skilled in the art. The embodiment of the invention described herein focuses on the prioritisation of instruction fetch to feed an instruction scheduler 4 which is preferably capable of issuing instructions on more than one thread on any given clock cycle. A block diagram of a suitable system embodying the invention is shown in FIG. 2. This shows all the main elements in an instruction fetch sub-system.

In this embodiment, there are two sources of instruction data, although there could be only one, or more than two. These are the instruction cache 20 and on chip RAM 22, the latter of which is loaded with embedded instructions for the microprocessor which may be required to run on various ones of the executing instruction threads. When a thread requires an instruction, it must be fetched from either the instruction cache 20 or from the on chip RAM 22. A thread requesting an instruction sends its request to one of the available sources of instructions, i.e. the one containing the instruction being requested. Each thread can only issue one instruction fetch per clock cycle.

As, there are two sources of instructions, each may be accessed at the same time as the other by different threads. In order to determine which thread is to access instructions from either the instruction cache 20 or the on chip RAM 22, each source of instructions has a priority arbiter 24 coupled between it and the instruction fetch units for each of the threads.

Each priority arbiter is coupled to an instruction fetch unit 26 for each of the threads (thread 0 to thread n). Via this connection, the priority arbiter can receive requests for instructions with associated prioritisation data and can provide fetched instructions to an Instruction fetch unit 26.

Each instruction fetch unit 26 includes an instruction buffer which can hold up to eight instructions in readiness to feed to an instruction decoder and resource interlocking unit 28 before issuing the instruction to an instruction scheduler 30 which will pass each instruction in turn to a processor for execution.

The priority arbiters 24 operate by receiving from each thread's instruction thread fetch unit 26 a measure of how much instruction data that instruction fetch unit 26 has left in its instruction buffer or in the process of being loaded into its instruction buffer, i.e. data relating to the number of instructions currently buffered. Therefore, if the instruction buffer can contain eight instructions, and it currently contains five instructions, data indicating that the thread currently has five instructions buffered (or space for three further instructions in its buffer) will be sent to the priority arbiter. The priority arbiter will then be able to compare this data with data received from other threads to determine which a priority order for the threads. It will then give priority to the thread with the highest priority that is also requesting an instruction.

The priority arbiter 24 can combine this first measure of prioritisation for issuance of instructions with a further measure. This second measure is a more sophisticated measurement of the overall priority given to a thread. This is typically a combination of a number of different properties of a thread. These can include a deadline count, which is a time by which a thread must be executed; a delay count, which is the delay since execution of the thread was first requested; a number of instructions yet to execute, and priority, this being the nominal priority given to the thread. The deadline count is the most important of these as it determines when a thread's execution must be complete. Other factors relating to thread priority may be used in measures of this type.

In the preferred embodiment of the Invention, therefore, each priority arbiter 24 will combine the priority measures relating to the need for an Instruction, i.e. the measure based on the fullness of the thread's instruction buffer, and the overall thread priority, which can be based on a number of different factors. Using these, it is possible for each priority arbiter to determine an ordered list of thread priorities when requesting instructions from either the instruction cache or the on chip RAM on each cycle such that on any given cycle the thread with the highest thus determined priority is the one that is given access to the instruction cache or the on chip RAM as appropriate. A thread will only access one of these sources of instructions at a time. It is not possible for a thread to fetch instructions from both at the same time.

In this example, two priority arbiters are shown one for the instruction cache and one for the on chip RAM. Each will have the same metrics presented to it. Each will produce the same prioritised list for each clock cycle. However, they will have mutually exclusive sets of threads requesting instructions from the sources with which they are associated. Embodiments of the invention may be implemented with any number of sources of Instructions including a single source.

More specifically, embodiments of this invention run on a multithreaded processor with two or more threads (typically four). A multithreaded processor is a microprocessor with execution units, caches and memories which additionally incorporates the concept of multiple threads of executing instructions. A thread consists of a stream of instructions acting to utilise the resources of the microprocessor, some of which may be private to that specific thread and some of which may be shared between threads. Resources include registers, bandwidth, and space in the cache and associated memories.

Each thread in a multithreaded processor has its own program counter, which in turn is used to control instruction fetch for that thread. Therefore, every thread has a piece of hardware to fetch instructions from instruction memory or Instruction cache for execution on that thread. It would be possible for each thread to have its own instruction memory or instruction cache but cost and size are minimised by sharing the instruction memories and instruction cache between all the threads and arbitrating between them for the right to access the memory or cache.

Simple arbitration methods such as round robin can work satisfactory up to a point. Difficulties are encountered, where different threads have different workloads and the balance between the priorities of the threads needs to be implemented such that threads with the greatest demand get priority over other threads when accessing instructions.

One form of more sophisticated arbitration is discussed in our European Patent Application No. EP1738259 mentioned above in which hardware monitors the load of the threads over time and matches this against their stated resource requirements. In that European Patent, this is used to determine access to resources such as memory.

We have appreciated that it is possible for more than one thread to issue an Instruction on any given cycle. For this to happen, a number of criteria must be met, most notably that all the threads must have an instruction available to issue, and secondly those instructions must be compatible with each other such that no two threads are trying to use the same resource at the same time. In this context, resource covers e.g. execution units, data cache access, coprocessor access etc. Therefore, in a system of n threads any number between 0 and n threads may issue instruction during a single cycle.

The process for determining which threads need which resources is complex, particularly in super threading processors where more than one thread may be executing instructions at the same time. A determination is commenced, however, by passing each instructions through a pre-decode stage prior to making it available to the instruction scheduler 4 as candidate for scheduling for execution. This pre-decode stage is used to pick out the resources that the instruction will require.

For a super threading processor, a reduced set of these resource requirements are tested. By picking a simple example, a thread may wish to use an execution unit to send a request for a data memory fetch to load or store some data. If another thread wishes to use either the same execution unit or wishes to use the data memory port for the data memory fetch, then it will be incompatible with execution of the first thread such that the two cannot be issued at the same time. If, however, another thread wishes to perform a set of different instructions such as a program branch which does not require those resources, it will be deemed to be compatible and may be issued for execution at the same time as a thread is used to request a data memory fetch.

In order to make an appropriate determination, all of the threads present have all of their stated resource requirements tested against each other in parallel. This process is symmetrical in that if a thread A is compatible with a thread B then by definition thread B will also be compatible with thread A. Therefore, the test only needs to be made once between each pair of threads.

A result of this compatibility testing, a flag is generated for each pairing of thread and the status of this flag is determines whether or not threads are compatible. Therefore, the result of testing each thread against all other threads is that for each pair of threads a compatibility flag is generated the status of which determines whether or not threads are compatible for execution, i.e. whether or not only two threads overlapping resource requirements at the same time.

In addition, the threads have a ranked ordering. The compatibility status information is used such that each rank in this order, a final compatibility set is prepared by considering each of the lower ranks in turn. If a rank is compatible where the highest priority thread it is added to the set for execution, otherwise it is skipped and the next thread considered. A final step to actual scheduling of instructions is that the determination is then made of the highest ranking thread which is able to be issued, i.e. it is not waiting on a resource or register to become available. This thread along with its super threading set (other threads which may execute with it is then issued together.

In order to maximize the ability of the threads to issue instructions at the same time, it is important that as far as possible all threads should have instructions available to be issued. Therefore the priority arbiter is configured to give preference, when appropriate, to fetching instructions for threads that have nothing in their thread instruction buffers or are running out of thread instructions in their thread instruction buffers. These threads then take precedence over other threads when fetching instructions, including threads which have a higher overall priority ranking.

Figure 3:
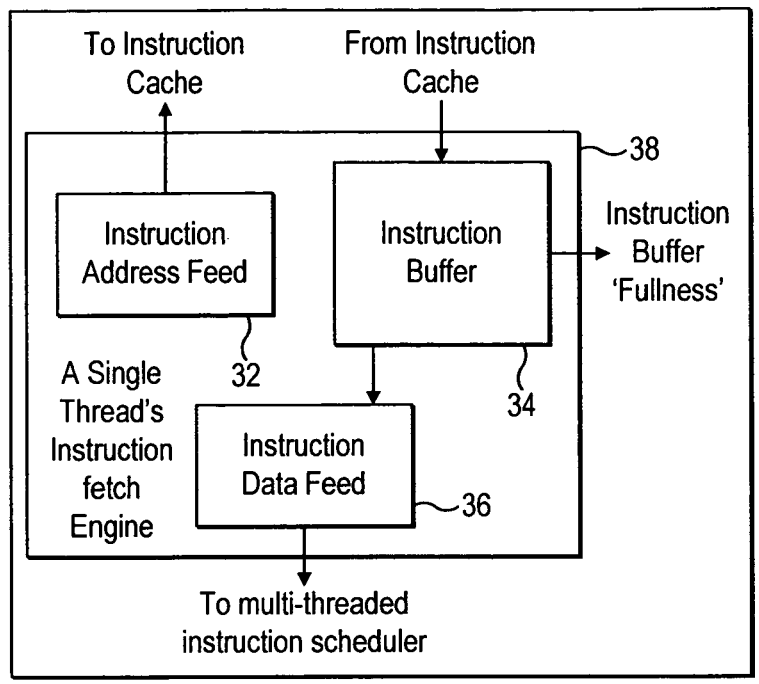
FIG. 3 shows an instruction fetch unit for use in the instruction fetch subsystem of FIG. 2; and, FIG. 4 shows a priority arbiter for use with the instruction fetch subsystem of FIG. 2.

A preferred embodiment of the threaded instruction fetch unit is shown in FIG. 3. Each thread is provided with such an instruction fetch unit. This particular example is shown with reference to obtaining instructions from the instruction cache, it could equally be used with the on chip RAM such as that shown in FIG. 2.

The instruction fetch unit comprises an instruction address feed unit 32, which sends requests for instructions to the instruction cache. There will be some latency between the issuing of instructions from the instruction address feed unit 32 due to the time to look up instructions in the instruction cache, it is preferable for the instruction fetch engine to be configured to request instructions with sufficient frequency to reduce or eliminate the latency altogether from the stream of issuing instructions.

In non-multithreaded microprocessors, the instruction fetch pipeline could be stalled if the consumption of instructions was less than the maximum rate of request. However, in multithreaded systems where the instruction cache is shared between the threads such stalling is not usually possible because it would introduce a dependency between threads such that a thread that has requested a number of instructions but not used them might then stall all the other threads in the system. Therefore, each thread instruction fetch unit incorporates an instruction buffer able to hold the returning data for a fixed number of instruction requests. As many instruction requests may be in transit as there are slots in the instruction buffer may be stored. The instruction buffer 34 is shown in FIG. 3. After the instruction buffer instructions pass via an instruction data feed unit 36 to the instruction scheduler.

In a preferred embodiment of the invention, data is extracted from the thread instruction fetch unit relating to the fullness of the instruction buffer 38. This may be a data value indicating the number of available slots in the instruction buffer or a data value indicating how many slots have been already occupied. This data is provided to a priority arbiter 24 of the type shown in FIG. 2 and is used by the priority arbiter to prioritise instruction fetches for threads which are running short of instructions in comparison with other threads. This then ensures that the instruction buffer for that thread has further instructions provided to it as early as possible so that a larger number of instruction are available to the instruction scheduler.

Therefore, the instruction fetch unit of FIG. 3 can be used for each of a number of threads and will provide data that indicates which thread has the instruction buffer with the most instructions in it and which has the least. These are compared by the priority arbiter produce a prioritised list. The thread which has fewest instructions in its instruction buffer can then be prioritised for the next instruction fetch on the next clock cycle (providing it is requesting an instruction). At the same time, at least one of the threads will issue an instruction to the instruction scheduler and this may in turn change the priority on the next clock cycle. Thus the thread with the highest priority which is also requesting an instruction from a source of instructions will fetch an instruction.

As discussed above, this system prioritises threads by sorting them into an order based upon the fullness of the instruction buffer 34 in each instruction fetch unit. Preferred embodiments of the invention modify this by adding an additional level of arbitration.

Figure 4:
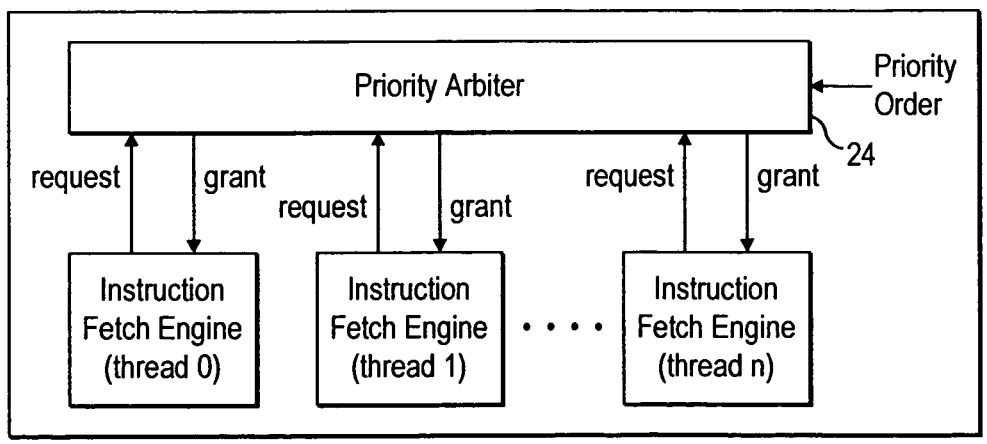

A priority arbiter of the type shown in FIG. 2 is illustrated in more detail in FIG. 4. The priority arbiter 24 receives instruction requests and grants instructions from its associated on chip RAM or instruction cache to each of the instruction fetch engines for the respective threads provided in the multithreaded processor. An input to the priority arbiter is the prioritised order determined for the instruction fetch engines for each thread as determined by the fullness of their respective instruction buffers. This may be derived in a separate unit.

Alternatively, the relevant data values may be provided to the priority arbiter itself which may then compute the necessary priority order.

Because each instruction fetch unit may only fetch enough instructions to fill its instruction buffer, any thread with a full instruction buffer will hot request a new fetch on each cycle. Therefore, the priority arbiter will determine the highest priority thread which is requesting a new instruction via its request signal.

The priority order determined by the priority arbiter 24 or received from a separate unit, is combined with the additional measures for priority discussed above which we refer to at the automatic million-instructions-per-second allocation (AMA) metric. This may be a combination of e.g. deadline count, delay count and possibly other factors effecting the execution of a thread. Effectively, it is an execution based metric which can be combined with the priority metric determined from the fullness of the instruction buffers.

The AMA metric is simplified into a simple ordering of the threads, i.e. it is a sorted list of threads. This is in contrast to the fullness of the instruction buffer for each thread which has a list of data regarding buffer capacity. Using these two pieces of information to determine a priority order is then implemented by the priority arbiter 24.

The buffer capacity is extremely important and a list is formed and sorted into order of fullest to emptiest of instruction buffers for threads. The emptiest is the higher priority. If all of the threads have a different buffer fullness then, in a preferred embodiment of the invention, this is the end of the process. The AMA metric is used only to determine the correct order of threads which have the same buffer fullness.

For example, if we have four threads each of which has an empty instruction buffer then each will have an equal need for an instruction to be fetched. Therefore, the arbiter must then consider the AMA metrics of each thread. These will be ranked 3, 2, 1, and 0. If 3 is the higher priority metric and 0 is the lowest, the thread which has an AMA of 3 will have the highest priority for the next instruction fetch.

In another example, if threads 0, 1, 2, and 3 have a need for instructions which are given priorities 1, 2, 2, 0 respectively and the AMA metric's for each thread are 3, 2, 1, and 0 respectively, then the final priority order will be 1, 3, 2, and 0. This is because threads 1 and 2 have the highest need for instructions and of these two threads, thread 1 has an AMA priority of 3, and thread 2 has an AMA priority of 2.

Where all threads have different needs, this will determine the order in which instructions are fetched and the AMA metric will not affect the order in which instructions are fetched. The priority arbiter is implemented preferably in hardware at present since this enables faster determination of priorities. However, as software becomes faster it may be possible to implement it in software and indeed in some applications at present a software embodiment may give acceptable performance. In operation, each of the threads are checked internally each clock cycle to determine whether or not they are requesting an instruction from any particular memory. If the highest priority thread is requesting an instruction and is not blocked in some way then the request is issued. This will alter the need metric which will employed on future cycles. If the highest priority thread is not making a request then all other priorities will be considered in turn to see if they can be used. If no thread can request an instruction then no request is made on that cycle.

Once an instruction has been fetched, it is supplied directly from the on chip RAM or the instruction cache to the thread instruction fetch unit. The order in which instructions reach the instruction fetch units may vary in dependence on the source of instructions being fetched and their location within each source.

It will be appreciated that using the system of FIG. 2 where instructions can be fetched from an instruction cache or from dedicated instruction memory, the instruction cache and the instruction memory may respectively be accessed by different threads at the same time. This necessitates two priority arbiters. The priority order list for the arbiters may be shared between the two devices.

Therefore, preferred embodiments provide an arbiter for each source of instructions which is coupled to each of the instruction fetch units for executing threads. These receive instruction fetch requests from each thread which requires an Instruction at various times and arbiter between request to determine which thread should receive an instruction from that source. Each thread can only issue one instruction fetch per clock cycle. Preferably, a thread will not request an instruction from a different source while it still has requests outstanding from a first source.

The invention claimed is:

1. A method for prioritizing fetching of instructions from at least one source of instructions in a multithreaded processor system, comprising:
    receiving from a plurality of threads executing on said multithreaded processor system requests to fetch instructions from a source of instructions;
    determining a first metric for each thread based on the number of instructions that are currently buffered for that thread;
    determining a second metric for each thread respectively based on at least one execution parameter for that thread;
    determining a ranked priority order for said plurality of threads by combining the first metrics and the second metrics for each thread; and
    fetching an instruction from the source for the thread with the highest priority in the ranked priority order.

2. The method according to claim 1, wherein a higher priority is given to a thread with a smaller number of buffered instructions.

3. The method according to claim 1, further comprising receiving requests to fetch instructions from at least two of the plurality of threads in a single clock cycle.

4. The method according to claim 1, wherein the at least one source of instructions comprises an instruction cache and further comprising sending requests for instructions to the instruction cache from an instruction fetch unit.

5. The method according to claim 1, further comprising directly providing the instruction from the source to an instruction fetch unit for the thread to which the fetched instruction pertains.

6. The method according to claim 1, wherein more than one thread may issue instructions for execution on each clock cycle.

7. The method according to claim 6, further comprising using an execution ranked order to determine which thread with instructions in its buffer should execute on each clock cycle.

8. A system for prioritizing the fetching of instructions for each of a plurality of executing threads of instructions in a multithreaded processor system comprising:
    a source of instructions;
    a plurality of instruction fetch units each associated with a respective one of each of said plurality of executing threads, each instruction fetch unit configured to issue a request to fetch an instruction from said source of instructions, for its associated thread; and a priority arbiter operatively coupled between said source of instructions and said plurality of instruction fetch units, said priority arbiter being configured to determine a priority among multiple simultaneously received requests from said instruction fetch units, by combining a first metric for each thread with a second metric for each thread, said first metric being based on the number of instructions that are currently buffered for that thread, and said second metric being based on at least one execution parameter for that thread, and determining a ranked priority order of said plurality of threads based on a result of said combination of metrics;

wherein said priority arbiter fetches an instruction from the source for the thread with the highest priority in the ranked priority order.

9. The system according to claim 8, wherein said combination gives a higher priority to a thread with a smaller number of buffered instructions.

10. The system according to claim 8, wherein multiple threads may request instructions from the source of instructions on a single cycle of a clock.

11. The system according to claim 8, further comprising a second source of instructions from which threads may request an instruction to be fetched.

12. The system according to claim 11, wherein a thread which has requested an instruction from a first source of instructions may not request an instruction from a second source of instructions until the first request has been completed.

13. The system according to claim 8, wherein instructions for more than one thread are capable of being executed within execution resources of the system on each cycle of a clock.

14. The system according to claim 13, wherein the system is configured to assign to threads an execution rank order to determine which thread or threads with buffered instructions should execute on each clock cycle.

15. The system according to claim 8, wherein the at least one execution parameter pertains to at least one of a deadline by which execution of a set of instructions comprised by a thread is to be completed and an amount of delay since execution of that thread was requested.

16. The system according to claim 15, wherein a thread which has requested an instruction from a first source of instructions may not request an instruction from a second source of instructions until the first request has been completed.

17. The system according to claim 8, further comprising an instruction scheduler configured to issue instructions for execution according to an execution ranked priority ordering of the threads on each clock cycle.

18. The system according to claim 17, wherein the instruction scheduler is further configured to issue one or more instructions that were determined to be compatible with the instruction to be issued for the thread with the highest priority in the execution ranked priority ordering.

19. The method according to claim 1, wherein the at least one execution parameter pertains to at least one of a deadline by which execution of a set of instructions comprised by a thread is to be completed and an amount of delay since execution of that thread was requested.

* * * * *